United States Patent [19]

Shannon

[11] Patent Number: 4,481,110

[45] Date of Patent: Nov. 6, 1984

[54] FEEDER FILTER BAG FOR BYPASS FEEDERS

[75] Inventor: James E. Shannon, Naperville, Ill.

[73] Assignee: Nalco Chemical Company, Oak Brook, Ill.

[21] Appl. No.: 484,654

[22] Filed: Apr. 13, 1983

[51] Int. Cl.³ ........................ B01D 35/02; B01D 25/30

[52] U.S. Cl. .................................... 210/199; 210/205; 210/451; 210/452; 210/463

[58] Field of Search ..................... 210/198.1, 199, 206, 210/205, 264, 282, 483, 455, 459, 190, 169, 200, 203, 287, 433.1, 434, 443, 444, 451, 452, 454, 463, 732; 137/101.11, 268; 222/189; 423/499, 658.5

[56] References Cited

U.S. PATENT DOCUMENTS

| | | | |
|---|---|---|---|
| 796,910 | 8/1905 | Hernan | 210/463 |
| 846,100 | 3/1907 | Estep | 137/268 |
| 1,435,790 | 11/1922 | Bachman | 210/206 |
| 2,135,969 | 11/1938 | Donaldson | 137/268 |
| 2,758,877 | 8/1956 | Gleason | 137/268 |
| 3,029,837 | 4/1962 | Neudeck | 210/198.1 |
| 3,055,503 | 9/1962 | Oliver | 210/438 |
| 3,442,800 | 5/1969 | Jasionowski | 210/206 |
| 3,612,279 | 10/1971 | Hostetter | 210/206 |
| 3,797,646 | 3/1974 | Horne | 210/198.1 |
| 3,876,544 | 4/1975 | Fowler | 210/198.1 |
| 4,303,515 | 12/1981 | Rademacher | 210/198.1 |
| 4,339,332 | 7/1982 | Jasperson | 210/198.1 |
| 4,347,224 | 8/1982 | Beckert et al. | 210/198.1 |

FOREIGN PATENT DOCUMENTS

| | | | |
|---|---|---|---|
| 12593 | 5/1933 | Australia | 137/268 |
| 2301447 | 7/1974 | Fed. Rep. of Germany | 137/268 |
| 4248 | of 1914 | United Kingdom | 137/268 |

OTHER PUBLICATIONS

Hackh's Chemical Dictionary, Grant, p. 536, 4th ed., 1969, McGraw Hill Book Company, New York.

*Primary Examiner*—Richard V. Fisher
*Assistant Examiner*—Wanda L. Millard
*Attorney, Agent, or Firm*—John G. Premo; Robert A. Miller; Donald G. Epple

[57] ABSTRACT

A bypass feeder of the type comprising a tank having a closeable rounded top opening, an inlet and outlet opening positioned on the side of the tank, includes a rectangular frame filter bag holder dimensioned to fit inside the tank, the frame having its bottom portion fitted with a plug having a tapered round opening, an L-shaped inlet pipe adapted to be received into the tapered opening of the plug, a filter bag dimensioned to fit over the filter bag holder and having a drawstring adjustable bottom opening for fitting the opening tightly against the plug. The improvement of the invention resides in the filter bag also having an open top and a sealing ring adapted to engage the open inside top of the filter bag and force seal it against the inside of the closeable rounded top opening.

1 Claim, 4 Drawing Figures

FEEDER FILTER BAG FOR BYPASS FEEDERS

INTRODUCTION

A popular bypass feeder containing a filter element is sold by the J. L. Wingert Company of Santa Ana, Calif. This device consists of a conventional top opening side stream filter tank. Positioned inside thereof is a cloth filter bag which removes impurities from liquid being fed into the tank which contains the chemical substances to be fed from the tank.

The present invention is directed to a simple modification of the so-called Wingert Feeder wherein it is possible to filter the fluid entering the inlet of the feeder and to use the filter means for controlling the amount of chemical fed to a system.

THE DRAWINGS

For a better understanding of the invention, reference may be had to the drawings of which:

Figure 1:
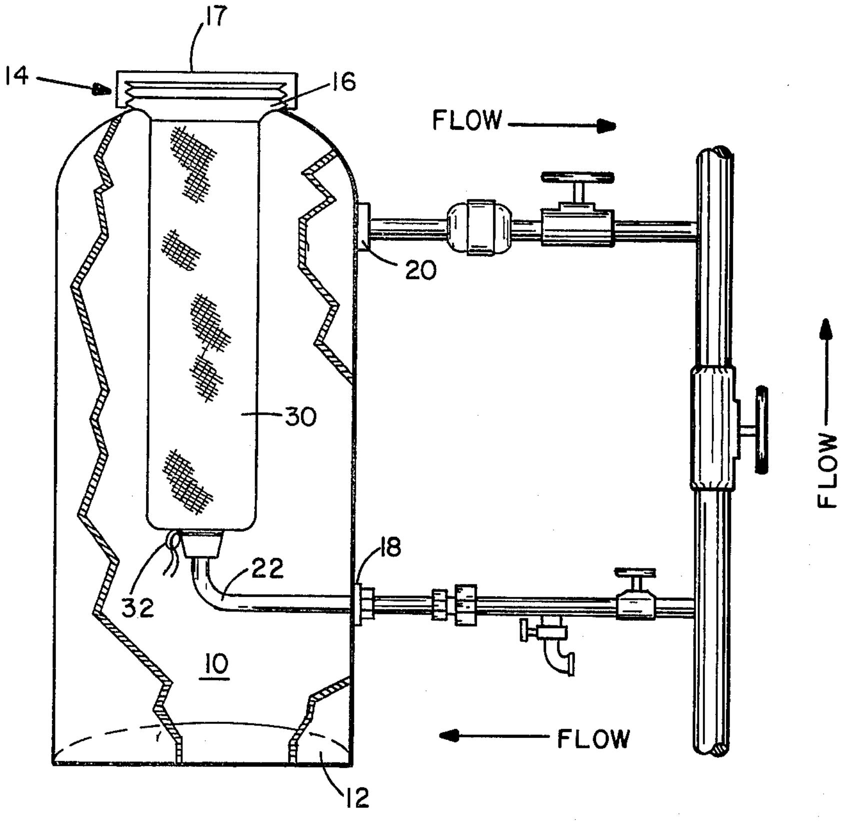
FIG. 1 is a vertical view of a Wingert Bypass Feeder cutaway in part to show the interior thereof. The feeder shown has been fitted with the modifications of the invention.

With specific reference to the drawings, FIG. 1 shows the bypass feeder tank 10 having a bottom 12 and a top 14.

The top has a male-threaded top opening 16 against which may be sealed with threaded closure cap 17.

Figure 2:
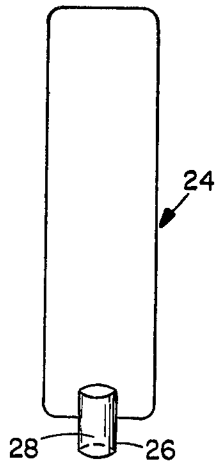
FIG. 2 is a vertical view of the bag holder which allows the filter bag used in the feeder to be maintained in a vertical position.

The feeder has fitted along its sides an inlet opening 18 and an outlet opening 20. Passing through the inlet opening 18 is an L-shaped pipe assembly 22. Positioned within the tank is the filter bag holder 24 which is shown in FIG. 2. It is a wire frame having its bottom connected to a vertically mounted plug 26 which contains a tapered bore 28. The tapered bore 28 engages the L-shaped pipe assembly in a snug fitting relationship allowing the bag holder to remain in a fixed upright position.

Also fitted within the tank and over the wire frame is filter bag 30 which has a drawstring opening 32 which allows the bag to be sealed against the plug 26.

This assembly allows the liquid to pass through the filter bag which removes any solid impurities. The filtered fluid passes into the main portion of the tank which would contain chemicals to be fed. The filtered fluid contacting the chemicals dissolves or disperses some of the chemical and then passes through outlet 20 and into the system or unit to be treated.

The present invention improves upon the device thus described by means of a simple mechanical adaption thereof. In particular, the top of the filter bag in the present invention is open, and is of slightly larger diameter than the circular opening of the tank. In the practice of the invention, the bag is held against the opening in the top of the tank by means of sealing ring 34 which is constructed of a semi-rigid material and is of sufficient diameter to allow force fitting of the ring to tightly urge the bag against the inside of the male-threaded top opening.

Figure 3:
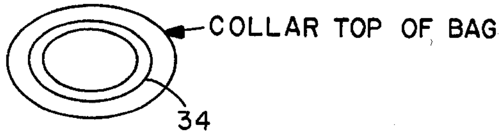
FIG. 3 is a top view of a sealing ring positioned within the top of the feeder used in the present invention to hold the modified filter bag against the top of the feeder.
Figure 4:
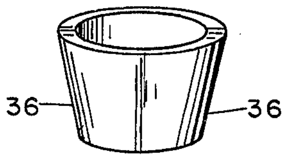
FIG. 4 is a vertical view of the sealing ring shown in FIG. 3.

The ring 34 is preferably made of a semi-rigid material to allow easy fitting into the top of the tank. A preferred material of construction is Teflon or other similar chemically resistant plastic. The sealing ring is shown in place in FIG. 3 and in FIG. 4 it is illustrated as having slightly tapered sides 36 to facilitate easy placement of the ring into the top of the tank.

After the tank is thus fitted with the filter bag and ring, chemical is added to the bag and the cap 17 is sealed and the unit put into operation. Water entering in the bottom of the bag flows into the chemical which is dissolved or dispersed as fine particles and released through the filter bag. Thus, the water is filtered, and dissolution or fine dispersion of the chemical is assured.

Certain obvious modifications may be made to the invention. It is evident that the mesh size of the filter bag can be varied to adjust the particle size of chemicals fed. Also, the sealing ring 34 could be fitted with male threads to engage internal threads within the top of the feeder. Also, the sealing ring 34 could be integrally made a part of the bag and bag holder assembly.

Having thus described my invention, it is claimed as follows:

1. In a bypass feeder of the type comprising a tank having a closeable rounded top opening, means defining an inlet opening and means defining an outlet opening positioned on the side of the tank, a rectangular frame filter bag holder dimensioned to fit inside the tank, said frame having its bottom portion fitted with a plug having a tapered round opening, an L-shaped inlet pipe received into the tapered opening of the plug, a filter bag dimensioned to fit over the filter bag holder and having a drawstring adjustable bottom opening for fitting the opening tightly against the plug, the improvement which comprises the filter bag also having an open top and a sealing ring having slightly tapered sides engaging the open inside top of the filter bag and force sealing it against the inside of the closeable rounded top opening.

* * * * *